Patented Aug. 7, 1951

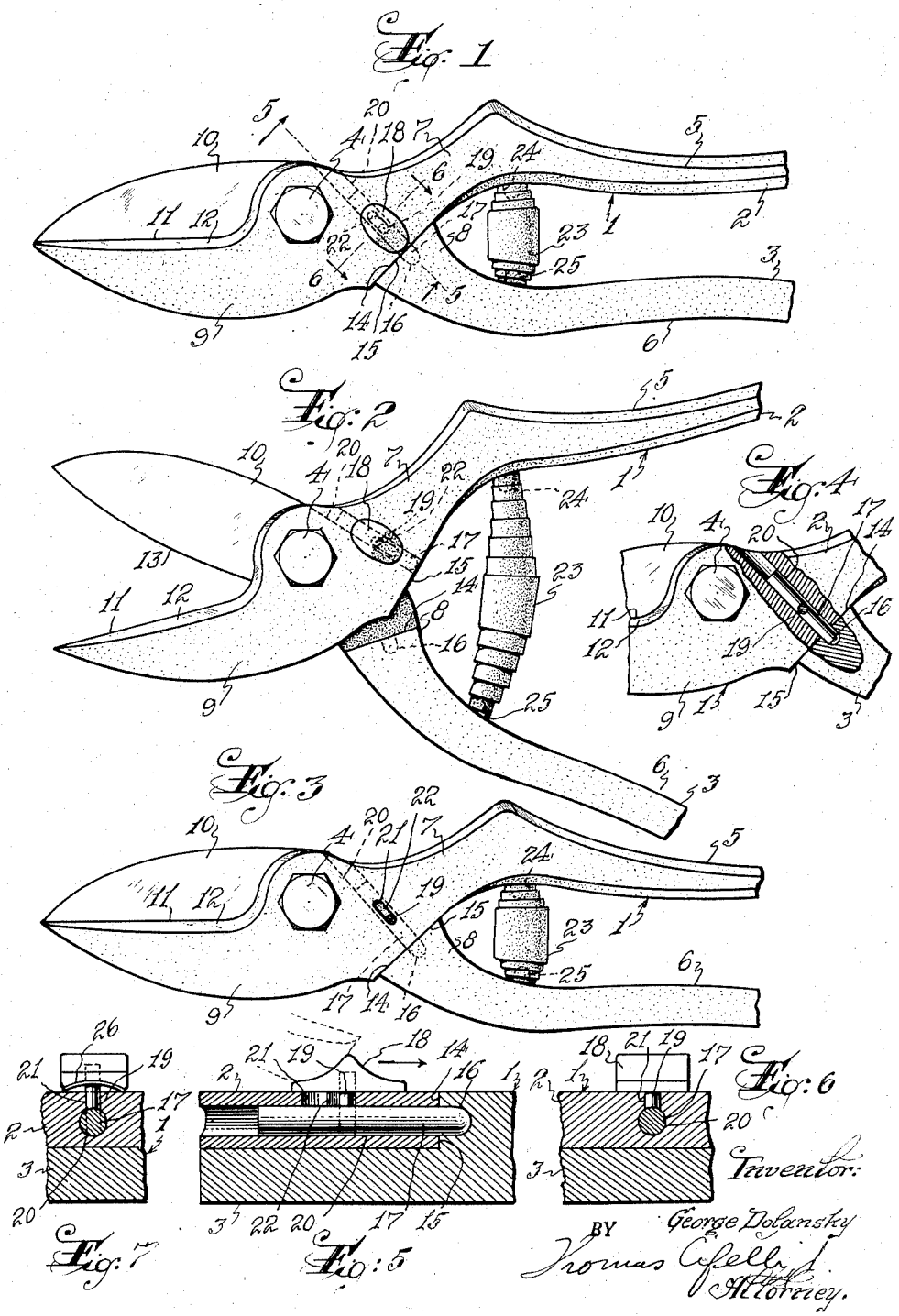

2,563,590

UNITED STATES PATENT OFFICE 2,563,590

PRUNING SHEARS AND THE LIKE

George Dolansky, Newark, N. J.

Application May 18, 1949, Serial No. 93,903

1 Claim. (Cl. 30—262)

My invention relates to pruning shears and other hand tools of the crossed lever type. More especially, my present invention resides in providing such tools neat in appearance, efficient in operation, and which possess a simple and effective novel locking mechanism rendering the locking of such tools safe and secure, even against accidental impact or dropping of the tools.

While I am aware that others have already suggested pruning shears and the like having locking devices, so far as I am aware such locking devices are subject to certain disadvantages. Thus, for example, some of the known devices are somewhat complicated in construction and consequently expensive. Others of known devices are undesirable because their locking mechanisms sometimes fail during use, permitting the shears to become open when accidentally dropped or moved.

In accordance with my present invention, I provide self-locking pruning shears and the like of the crossed lever type by utilizing known hand tools of the type in question in conjunction with the novel latching mechanism hereinafter described.

With the foregoing in mind, my present invention consists of certain novel features of construction and combinations and arrangements of parts which will be more fully hereinafter described and which will become apparent from the following detailed description taken in connection with the accompanying drawings in which like characters represent like parts throughout and which form a part hereof.

In the drawings:

Fig. 1 is a side elevation of a hand pruner made in accordance with my invention, the ends of the handle portions of the pruner being broken away, the pruner being shown in closed position;

Fig. 2 is similar to Fig. 1, the pruner being shown in open position;

Fig. 3 is similar to Fig. 1, the finger piece having been removed to expose parts of my novel locking mechanism;

Fig. 4 is a fragmentary horizontal view partly in section showing the locking bolt or catch in place when the shears are in closed position;

Fig. 5 is a fragmentary section taken along the line 5—5 of Fig. 1;

Fig. 6 is a fragmentary section taken along the line 6—6 of Fig. 1; and

Fig. 7 is a modified form of my novel locking mechanism wherein a spring is provided to hold the locking unit in place.

Referring to the drawings, shears 1 (for example, the Wiss draw-cut 808 shears) shown as a preferred embodiment for purposes of illustration have two crossed levers, 2 and 3, pivoted on pivot bolt 4. Each of the levers has a handle portion 5 and 6, shank portions 7 and 8, and blade carrying portions 9 and 10, respectively. The blade 11 of lever 2 has a beveled face 12 and is concave in form. Its cooperating blade 13 carried by lever 3 is convex in form.

Located between the shank 8 and blade carrying portion 10 of lever 3 is shoulder 14. Cooperating with shoulder 14 when the shears 1 are in closed position is side 15 of lever 2. Shoulder 14 has a slot or groove 16 therein adapted to receive catch or bolt 17 integrally joined to finger piece 18 by stem 19. Cooperating slot 20 is carried by lever 2. Slots 16 and 20 are so arranged that when the shears 1 are in closed position the slots form a continuous channel within which the bolt 17 may be moved back and forth.

In order to permit movement of the bolt 17 in the slots 16 and 20, channel 21 is provided in lever 2, the channel 21 being above and terminating in slot 20. Bolt 17 is so disposed that when the shears 1 are in closed position part of the bolt 17 enters slot 16, and when the shears are in open position stem 19 is carried to the end of channel 21 farthest from the face 15 of lever 2. Located near this latter end of the channel 21 is channel projection 22 against which the stem 19 is slightly forced in order to permit passage of the stem 19 through the resulting constriction in the channel. The sizes of the channel 21, stem 19 and projections 22 are such that after the stem 19 has passed beyond the projection 22 and the shears 1 are in open position (Fig. 2) the stem 19 normally stays in position. A force has to be applied in order to move the stem 19 in either direction beyond the projection.

When the shears 1 are in open position they are maintained normally in that position by means of the cone spring 23 of the volute type disposed on projections 24 and 25 carried by handles 5 and 6 of levers 2 and 3, respectively.

If desired, in place of the projection 22 of channel 21, a spring 26 (Fig. 7) may be disposed under the finger piece 18 and the latter may be secured to stem 19 by suitable means, for example thread means (not shown), thereby permitting the bolt 17 to be held in any desired position and at the same time permitting it to be moved within slots 16 and 20 by slight force of the finger against finger piece 18.

The operation of my device is believed to be apparent from the foregoing description of the construction of my novel pruning shears. The operation is a one-hand one and is characterized by simplicity, ease, and efficiency. Thus, for example, with the shears in the position shown in Fig. 1 all that need be done in order to open the shears is to place the gripping hand around handle portions 5 and 6, the thumb of the hand engaging the shears 1 being gently pressed against the finger piece 18 in a direction towards the upper part of lever 2. As the tip of bolt 17 passes beyond shoulder 14 of lever 3 the action of the cone spring 23 causes the shears 1 to open quickly to open position.

As above-noted, when the locking unit is in open position stem 19 is normally retained within channel 21 at the end of said channel farthest from shoulder 14 by the projection 22.

In order to close the shears 1 all that is necessary is to exert a pressure against the cone spring 23 by causing the handles 5 and 6 to approach each other. When the shears 1 are in closed position the finger piece 18 is moved by the thumb of the hand holding the shears in the direction of face 15.

When the shears are in closed position (Fig. 1) the cone spring 23 exerts pressure against the handles 5 and 6, thereby tending to maintain the shears in closed position because the part of bolt 17 which is carried by slot 16 when the shears are in closed position aids in maintaining locked position.

While my invention has been described in detail as to construction and arrangement of parts it is understood that some modifications may be made herein without departing from the spirit of my invention. Thus, while I have shown pruning shears as a preferred embodiment of my invention it will be understood that my invention is generally applicable to shears of the crossed lever type and is not to be restricted to the particular type of shears described herein. Also, while the pruning shears illustrated and described herein are to be understood as being of sturdy construction, my invention is not to be limited thereto, as it is also applicable to shears which may be classified in the toy category, for example, plastic scissors. In view of the foregoing, no limitations are intended other than those imposed by the scope of the appended claim construed as broadly as permissible in view of the prior art.

I claim:

Shears and the like comprising a pair of crossed levers having cooperatively-engaging blade and face portions and means adapted to keep said shears normally in open position, cooperating grooves terminating in said faces near said blade portions in each of said levers, a catch movably disposed in one of said grooves, a stem secured to said catch, a finger piece secured to said stem, a channel located between said catch and said finger piece and joining the groove in which said catch is disposed, and a constriction comprising a protuberance in said channel of such size that a force against a finger piece is required to effect passage of said stem through said constriction.

GEORGE DOLANSKY.

REFERENCES CITED

The following references are of record in the file of this patent:

UNITED STATES PATENTS

| Number | Name | Date |
| --- | --- | --- |
| 576,862 | Lebold | Feb. 9, 1897 |
| 2,310,959 | James | Feb. 16, 1943 |
| 2,396,583 | Lenk et al. | Mar. 12, 1946 |
| 2,461,941 | Sutton | Feb. 15, 1949 |